United States Patent

Patterson et al.

[15] 3,646,930
[45] Mar. 7, 1972

[54] AUTOMATIC PHYSIOLOGICAL RECORDING AND ALARM SYSTEM FOR HOSPITALS

[72] Inventors: Robert E. Patterson, Raytown; John L. Walker, Sr., Lake Lotawana, both of Mo.

[73] Assignee: Johnnie Walker Medical Electronics Inc., Kansas City, Mo.

[22] Filed: Nov. 3, 1969

[21] Appl. No.: 873,564

[52] U.S. Cl. .................. 128/2.06 F, 128/2.06 A, 128/2.1 A
[51] Int. Cl. ............................................................. A61b 5/04
[58] Field of Search ................... 128/2.05 P, 2.05 Q, 2.05 R, 128/2.05 S, 2.05 T, 2.06 A, 2.06 E, 2.06 F, 2.06 G, 2.06 R, 2.1 A, 2.1 R

[56] References Cited

UNITED STATES PATENTS

| 2,848,992 | 8/1898 | Pigeon | 128/2.06 F |
| 3,174,478 | 3/1965 | Kahn | 128/2.06 F |
| 3,343,528 | 9/1967 | Kirkham | 128/2.06 B |
| 3,513,833 | 3/1970 | Finch et al. | 128/2.06 R |

FOREIGN PATENTS OR APPLICATIONS

| 718,131 | 11/1954 | Great Britain | 128/2.1 A |

OTHER PUBLICATIONS

Hagan et al., " American Journal of Medical Electronics," Apr.– June, 1963, pp. 147– 151

Primary Examiner—William E. Kamm
Attorney—D. A. N. Chase

[57] ABSTRACT

An EKG monitoring system for hospitals employing bedside units each connected by a simple two-wire cable to a remote central monitor having a chart recorder. A monitor signal, frequency modulated by an EKG signal, is produced by each unit and is carried over the cable to the central monitor. When the repetition rate of the R wave of a patient's EKG signal rises above or falls below a predetermined safe range of repetition rates, or the R wave amplitude decreases to less than a predetermined minimum amplitude, an alarm oscillator in the unit is triggered and its output is multiplexed with the monitor signal, the alarm and monitor signals being different in frequency. The central monitor is frequency discriminatory and responds to the alarm signal to activate the chart recorder and feed the monitor signal thereto from the unit at the bedside of the ailing patient.

10 Claims, 3 Drawing Figures

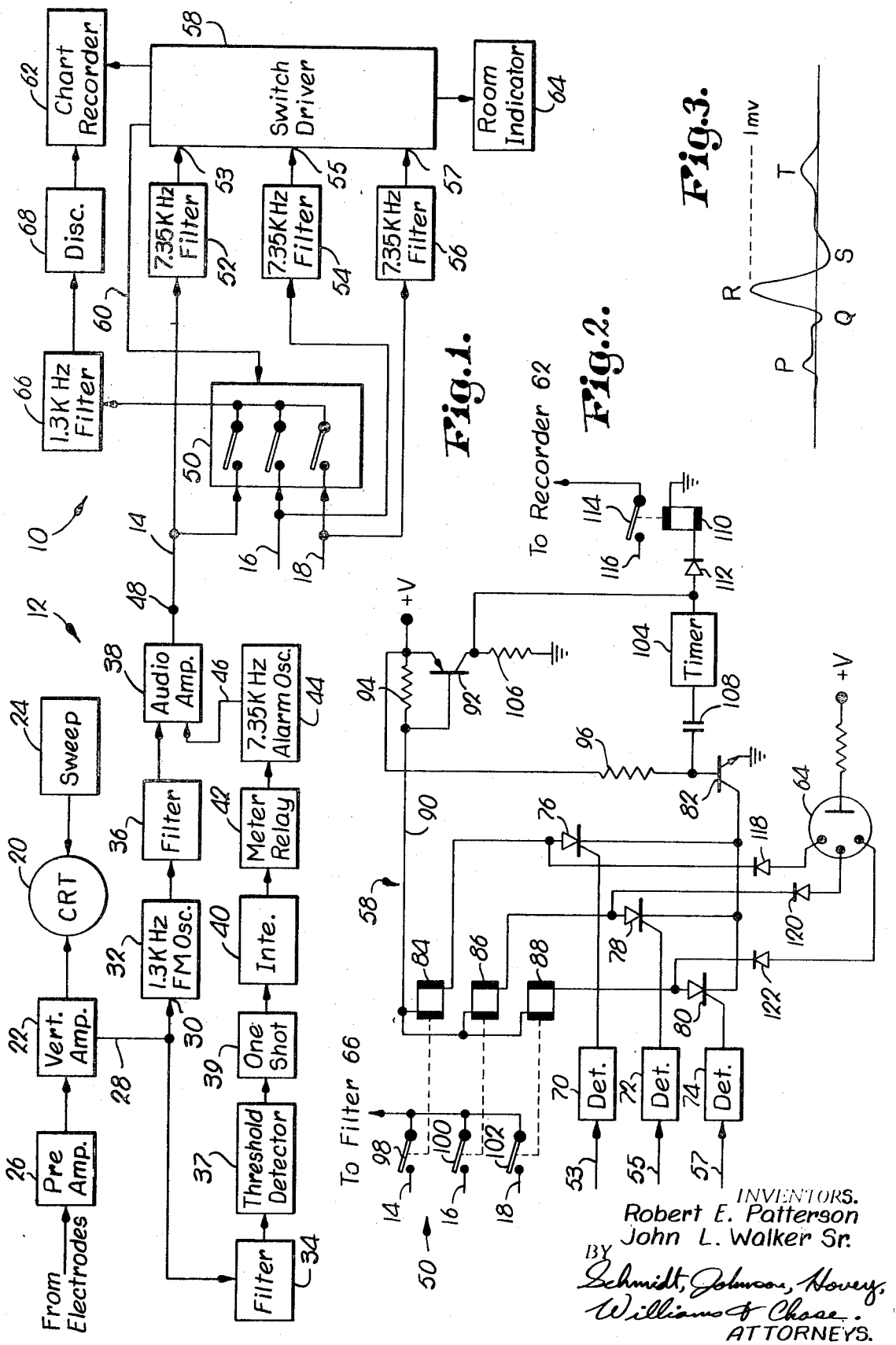

AUTOMATIC PHYSIOLOGICAL RECORDING AND ALARM SYSTEM FOR HOSPITALS

This invention relates to improvements in central physiological monitoring systems for hospitals and, more particularly, to an improved EKG monitor in which a chart recorder or other readout means at a central station is activated in response to the occurrence of a possible emergency condition in any one of a number of patients tied to the monitoring system.

Central monitoring systems of this general type normally employ a bedside unit for each patient, the various units being electrically connected to a central nurses' station where the condition of each patient may be selectively monitored. In normal use, however, the central monitor is not operative and remains in standby unless a possible emergency condition develops, as determined by the EKG signal being constantly generated by each of the patients. When one of the EKG signals exhibits a characteristic indicative of improper cardiac response, the central monitor is automatically activated to read out the EKG and identify the patient in question.

Heretofore, such monitoring systems have been difficult to adapt to many hospital applications since large, multiconductor cables were required between each bedside unit and the central monitor or master station. It is desired that each bedside unit contain its own EKG oscilloscope for bedside readout, and normally the connections from a common cathode ray tube driver would be effected through the interconnecting cable, as well as power connections and signal leads to the unit. Thus, reliance has been placed on the central station to provide power and CRT drive as well as the necessary functions of monitoring and automatic response to the development of an emergency condition.

Besides the difficulty of installation in existing hospital structures where provision for the complex cabling was not made at the time of initial construction, a second problem is presented in that the necessity for power connections between the central station and the bedside units subjects the system to hum and noise induced in the monitor signal transmissions as a result of differences in ground potentials existing in the building at the diverse locations of the bedside units and central station. Manifestly, proper isolation between the bedside units and the central monitor and immunity from hum and noise are quite important since any interference with the monitor signals could cause distortion and adversely affect the proper operation of the system.

It is, therefore, the primary object of the present invention to provide a physiological monitoring system which does not have the disadvantages discussed above and which may, accordingly, be readily installed in existing hospital facilities and is free from the problem of proper isolation between the bedside units and the central monitor.

As a corollary to the foregoing object, it is an important aim of this invention to provide a monitoring system as aforesaid in which multiplexing of a patient condition monitoring signal and an alarm or violation signal is employed to permit information transfer from each bedside unit to the central monitor to be effected by a simple electrical cable connection, such as a coaxial cable or a two-wire lead.

Another important object of the invention is to provide a bedside unit having its own self-contained readout which is electrically independent of the central monitor readout, in order to eliminate electrical connections between the bedside units and the central monitor which would otherwise be required.

Still another important object of the invention is to provide multiplexing of the patient condition monitoring signal and the warning or violation signal of each unit, wherein such signals are different in frequency, and to provide a central monitor station having frequency discriminatory control means responsive to the warning signal for activating a suitable readout in the central station which then displays only the patient condition information coming from the unit that is also producing the warning signal.

Yet another important object of the invention is to provide a system as aforesaid which is automatically responsive to either of two characteristics of an EKG signal generated by any of the patients tied to the system, the two characteristics being the amplitude and repetition rate of the R wave of each patient's EKG signal.

A further and important object of the invention is to provide an EKG monitoring system as aforesaid utilizing FM telemetry to transmit the patient condition information between each unit and the central monitor, and wherein the telemetry is multiplexed with the warning or violation signal at a given unit in the event that the amplitude or repetition rate of the R wave indicates that the condition of the patient is other than would be considered normal under the circumstances.

In the drawing:

FIG. 1 is a block diagram of the EKG monitoring system of the present invention;

FIG. 2 is an electrical schematic diagram illustrating a portion of the central monitor in detail; and FIG. 3 is a waveform graph illustrating the complex cardiac pulse which is repeatedly produced by a normal human heart.

Referring initially to FIG. 1, the central monitor of the system is broadly denoted 10 and may be utilized with any number of bedside units, one of which is shown in detail and broadly denoted by the numeral 12. Each bedside unit 12 is identical in circuit configuration and operation, the central monitor 10 being shown with three such units connected thereto via suitable electrical cables 14, 16 and 18.

The bedside unit 12 includes an EKG oscilloscope having a cathode-ray tube 20 driven by the output of a vertical amplifier 22 and a horizontal sweep circuit 24. A preamplifier 26 has its input connected to suitable body electrodes (not shown), the output thereof being fed to the input of the vertical amplifier 22. By way of example, the peak signal amplitude at the input of the preamplifier 26 would be on the order of 1 millivolt, the preamplifier output may be on the order of 50 millivolts, while the CRT drive from the output of the vertical amplifier 22 would be on the order of 50 volts. An auxiliary output 28 from the vertical amplifier 22 furnishes the EKG signal at a peak level of approximately one-half volt and is utilized as an information input to the remainder of the bedside unit circuitry.

The vertical amplifier output 28 is connected to the modulating signal input 30 of a 1.3 kHz. FM sawtooth oscillator 32, and is also connected to a bandpass filter 34 having a pass band of approximately 13 to 20 Hz. The sawtooth output from the oscillator 32 is fed to a low-pass filter 36 which filters the sawtooth to eliminate all but the fundamental sinusoidal component. The sinusoidal FM wave is then fed to one input of an audio amplifier 38 which also serves as a multiplexer, as will be explained.

The bandpass filter 34 feeds its output to a threshold detector 37 that, in turn, gates a monostable multivibrator or "one shot" 39. The one shot output is a series of pulses that are delivered to an integrator 40 having an output level proportional to the frequency or repetition rate of such pulses. More particularly, the integrator output is the average value of the one-shot output, and thus is a DC level that increases or decreases in accordance with an increasing or decreasing pulse repetition rate, respectively.

A meter relay 42 senses the integrator output level and is provided with normally open, low and high limit latching contacts which remain open as long as the integrator output level is between corresponding low and high values that, therefore, define an operational range over which neither of the contacts of the meter relay 42 will be actuated to the closed position. Closure of either set of contacts, however, triggers a 7.35 kHz. alarm oscillator 44 which delivers an alarm or violation signal at its output 46 that is, in turn, fed to a second input of the audio amplifier-multiplexer 38, the latter serving to effect a summation of the two inputs thereto (if the violation signal is present) and amplify the composite signal. The output connection of the unit 12 is illustrated at 48 and is the output of the amplifier-multiplexer 38, the cable 14 being connected thereto for transmission of the monitoring signal (or the composite signal) to the central monitor 10. The cable 14 is a simple two-wire lead or a two-conductor coaxial cable of the type that would commonly be employed in hospitals to connect television sets in the various rooms to a master antenna system. This is mentioned since, in installation of the system in hospitals having in-room television, the existing cables to the various rooms from the master antenna may be tapped into and serve as the cables for connection of the units 12 of the present invention to the central monitor 10. It is manifest that there will be no interference with the television sets due to the relatively low frequencies produced by the units 12, and further since the signal voltage level at each of the output connections 48 need only be on the same order as the signal levels produced by an ordinary telephone transmitter. Preferably, in practice, the output connection 48 would be presented by the secondary of a suitable output transformer (not shown) on the amplifier-multiplexer 38.

The cables 14, 16, 18, etc., from the various bedside units extend to a switching control 50 in the central monitor 10 and also extend to respective 7.35 kHz. filters 52, 54 and 56, additional such filters being provided for the other units of the system. Thus, the signal from each bedside unit is fed to a separate 7.35 kHz. filter, whereupon the outputs of all of the filters are delivered to a switch driver 58. Three control inputs 53, 55 and 57 of the switch driver 58 are illustrated herein and have the outputs of the filters 52, 54 and 56, respectively, coupled thereto. A control connection 60 extends from the switch driver 58 to the switching control 50, and the switch driver 58 also effects the operation of a chart recorder 62 and a room indicator 64 as will be subsequently explained. The switching control 50, upon operation thereof, connects any one of the cables 14, 16 or 18 to a 1.3 kHz. filter 66, the output thereof being fed to an FM discriminator 68 which, in turn, delivers a demodulated monitor signal to the chart recorder electronics.

Certain circuit details of an exemplary arrangement for the switch driver 58 and the switching control 50 are shown in FIG. 2. The control inputs 53, 55 and 57 of the switch driver 58 feed detectors 70, 72 and 74, respectively, which, in turn, have their outputs connected to the gates of silicon controlled rectifiers 76, 78 and 80. The cathodes of the SCR's 76, 78 and 80 are all directly connected to the collector of a NPN-commutating transistor 82, the emitter thereof being at chassis ground. The anodes of the SCR's 76, 78 and 80 are connected to the coils 84, 86 and 88, respectively, of three electromechanical relays, the opposite electrical sides of the coils 84, 86 and 88 being connected by a common lead 90 to the base of a PNP-transistor 92. A bias resistor 94 is connected between the base of the transistor 92 and the collector thereof, positive direct operating potential being supplied to such collector as indicated by the terminal labeled +V. A resistor 96 connects such terminal to the base of the commutating transistor 82. Three normally open relay switches 98, 100 and 102 are operated by the relay coils 84, 86 and 88, respectively, the movable poles of the switches 98–102 forming a common connection that extends to the input of the 1.3 kHz. filter 66.

A RC timer 104 has its input connected to the emitter of the transistor 92, a resistor 106 being connected from such emitter to ground. A capacitor 108 couples the output of the timer 104 to the base of the commutating transistor 82. The coil 110 of an electromechanical relay is connected to the emitter of the transistor 92 by a diode 112 and, upon energization thereof, closes a normally open relay switch 114. A suitable source of electric power is connected to a line 116 terminating at the normally open contact of the switch 114, the latter serving to activate the chart recorder 62 upon closure thereof.

The room indicator 64 may comprise a gas discharge numerical readout device as illustrated in FIG. 2, the anode thereof being connected to a source of positive supply voltage as indicated by the second terminal labeled +V. Three diodes 118, 120 and 122 connect the anode leads of SCR's 76, 78 and 80, respectively, to three of the cathodes of the indicator device 64. It may be appreciated that the device 64 would normally be provided with 10 cathodes representing the digits 0 through 9, and that several such devices 64 would be required to display multiple digit numbers. Therefore, the illustration in FIG. 2 is a simplified showing of a numerical readout arrangement which would be logically expanded for additional bedside units and multidigit identifying numbers. The numbers displayed could correspond to the numerical designations of the rooms in which the bedside units are located, or could comprise any other suitable patient identification.

OPERATION

The threshold detector 37 and the meter relay 42 of each bedside unit 12 are adjusted in accordance with the condition of the particular patient being monitored. One of the complex cardiac pulses repeatedly produced by a normal human heart is illustrated in FIG. 3 where it may be seen that the prominent R wave has a peak amplitude of approximately 1 millivolt prior to amplification. The letter designations P, Q, S and T are standard nomenclature for the lesser pulses of the complex wave which are also meaningful to a trained cardiologist.

The circuitry of the unit 12 commencing at the bandpass filter 34 is exclusively sensitive to the characteristic R wave. The threshold of the detector 37 is adjusted to a minimum level below which no output is obtained therefrom. Similarly, the acceptable range of the meter relay 42 is set in accordance with the range of R wave repetition rates that is medically acceptable for the particular patient. The pass band of the filter 34 eliminates low and high frequency components of the complex cardiac pulse in order to isolate and pass the R wave. Manifestly, this pass band is strictly governed by the characteristic to be monitored and, accordingly, would be changed as appropriate to adapt the teachings of the present invention to the monitoring of other physiological characteristics.

Before proceeding with a further discussion of the operation of the system, it is instructive to understand that power for each bedside unit 12 is obtained at each unit location, such as by connecting the unit to an ordinary AC convenience outlet. Furthermore, the EKG oscilloscope within each unit 12 is entirely self-contained since the vertical amplifier 22 and horizontal sweep circuit 24 form a part of the individual unit. The unit oscilloscope is incidental to the present invention but serves as a convenient means (auxiliary output 28 of the vertical amplifier 22) of obtaining the EKG signal in amplified form. The center frequency of the FM oscillator 32 is not critical but is selected to best suit the frequency response characteristics of the interconnecting cable 14.

The EKG signal at amplifier output 28 is translated in frequency for transmission over cable 14 by introducing the signal to the modulating signal input 30 of the oscillator 32, whereupon the sinusoidal monitor signal presented at the output of the filter 36 carries the EKG signal as modulation. The monitor signal is always available at the unit output connection 48 and thus, if desired, the central monitor 10 may be selectively activated to read out the monitor signal produced by any of the units 12. Manual override switching (not shown) in the central monitor 10 would be provided for this purpose so that the automatic control circuitry may be bypassed if a physician or nurse at the central station desires to observe the EKG of a particular patient or patients. Similarly, the alarm oscillator 44 in each unit 12 may be switched on without the occurrence of an emergency condition if an attending physician or nurse wishes for the chart recorder 62 in the central station 10 to trace the EKG on a permanent recording medium.

In normal usage, however, the chart recorder 62 is in standby and remains inoperative until an emergency condition occurs at one of the bedside units 12. Assuming that the R wave of a particular patient has a repetition rate either above or below the range preset into the meter relay 42, the output level of the integrator 40 corresponds to the unusually rapid or slow heart beat and effects closure of the high or low latching contacts of the meter relay 42. This, in turn, triggers the alarm oscillator 44 to cause the alarm or violation signal to be fed to the amplifier-multiplexer 38. The multiplexed, composite signal then appears at the 7.35 kHz. filter 52 in the central monitor 10 and the switch driver input 53 receives a signal. Before the violation signal was produced, the 7.35 kHz. filters in the central monitor 10 prevented any signal from reaching the switch driver 58 since the 1.3 kHz. monitor signals are not passed.

Referring to FIG. 2, the detector 70 effects rectification of the 7.35 kHz. violation signal and gates the SCR 76, it being understood that the commutating transistor 82 is normally conductive while the transistor 92 is normally noncondutive. When the SCR 76 goes into conduction, the relay coil 84 is energized and a voltage drop is produced across the resistor 94, causing the transistor 92 to turn on and deliver a signal to the input of the timer 104 by virtue of the voltage drop produced across the emitter resistor 106. The timer 104 may be set for any desired period (5 to 30 seconds, for example), depending upon the length of time that it is desired to maintain the central monitor 10 in operation.

Energization of relay coil 84 effects closure of switch 98 to, in turn, connect a lead of the cable 14 to the input of the 1.3 kHz. filter 66 (the other lead of each cable 14, 16 and 18 would be at the common ground potential of the central monitor circuitry). Therefore, only the monitor signal is passed to the FM discriminator 68 where the EKG signal is retrieved by demodulation and fed to the chart recorder 62 for readout. The chart recorder motor and electronics have been placed in operation by virtue of the energization of relay coil 110, causing closure of relay switch 114 and the connection of power to the chart recorder 62. Also at this time, the indicator device 64 is energized to identify the patient now being actively monitored. At the close of the period of timer 104, a negative pulse is produced at the timer output and delivered to the base of the commutating transistor 82 to momentarily turn the latter off, thereby returning the SCR 76 to its nonconductive state unless the gate from detector 70 is still present, in which case the central monitor 10 continues in operation and the timer 104 recycles. Provision is made at each unit 12 to disable the alarm oscillator 44 once a physician or nurse is in attendance so that the central monitor 10 is free to respond to another violation signal that might be produced at any of the other units 12.

In the event that the pulse rate of a particular patient is not in violation of the range preset into the meter relay 42 but, instead, the amplitude of the R wave falls below the threshold of the detector 37, it may be appreciated that the one shot 39 will no longer receive an input and will, therefore, remain in its stable state and not pulse the integrator 40. This causes the level of the integrator output to fall rapidly in accordance with the time constant of integration, whereupon the low limit contacts of the meter relay 42 ultimately close to trigger the alarm oscillator 44. Operation of the system is then the same as discussed above. When the chart recorder 62 in the central monitor 10 is rendered operative, it will be apparent to a trained observer of the EKG that the R wave amplitude is lower than desired, in contrast to the objectionable pulse rate condition.

Having thus described the invention, what is claimed as new and desired to be secured by Letters Patent is:

1. A physiological monitoring system comprising:
    a plurality of sensing units each adapted to be operably associated with a living organism,
    each of said units being provided with an output connection, means responsive to the organism for providing a low frequency physiological information signal having a characteristic indicative of the condition of the organism, means for providing a carrier signal having a high frequency relative to said information signal and modulating said carrier signal with said information signal to produce an electrical monitor signal for delivery to said output connection, and means for producing a violation signal of a relatively high frequency different than said carrier signal frequency if said characteristic indicates that the condition of the organism is other than a predetermined, normal condition thereof, and for delivering said violation signal to said output connection whereby, when the violation signal is produced, a composite signal comprising the monitor and violation signals is presented at said output connection;
    a central monitor remote from said units; and
    electrical cable means for transmitting said monitor and composite signals from said units to said central monitor,
    said cable means comprising a plurality of transmission line conductors, each of which extends from the output connection of a corresponding unit to said central monitor for transmitting thereto the monitor signal or the composite signal produced by the unit, whereby the same conductor is employed to carry either the monitor or the composite signal produced by an individual unit,
    said central monitor having means for processing an incoming signal from said units to retrieve the information signal thereon, readout means responsive to the retrieved information signal, and frequency responsive control means coupled with said readout means and normally maintaining the latter in a standby state,
    said control means being responsive exclusively to the frequency of said violation signals, and said control means activating said readout means in response to the violation signal of an incoming composite signal from any of said units and effecting delivery of the incoming composite signal to said processing means, whereby the readout means responds exclusively to the information signal whose characteristic is in violation of the predetermined, normal organism condition.

2. The system as claimed in claim 1,
each of said units having readout means at the unit location electrically independent of the readout means of said central monitor and operable to display the characteristic of the monitor signal produced by the unit.

3. The system as claimed in claim 1,
said information signal of each unit being an EKG signal having a periodically recurring R wave constituting said characteristic,
said predetermined, normal organism condition corresponding to a repetition rate of the R wave within a predetermined range of repetition rates, whereby said violation signal is produced by an individual unit if the R wave repetition rate is above or below said range.

4. The system as claimed in claim 1,
said information signal of each unit being an EKG signal having a periodically recurring R wave constituting said characteristic,
said predetermined, normal organism condition corresponding to an amplitude of the R wave above a predetermined minimum level, whereby said violation signal is produced by an individual unit if the R wave amplitude is below said level.

5. The system as claimed in claim 1,
said control means having switching means for coupling the transmission line conductor from the output connection of any of said units to said processing means, and frequency selective means coupled with all of said transmission line conductors and responsive to the violation signal of said incoming composite signal for operating said switching means to connect said processing means with the conductor from the unit where the violation is occurring.

6. The system as claimed in claim 5,
said central monitor being provided with indicating means responsive to the violation signal of said incoming composite signal for identifying the unit where the violation is occurring.

7. The system as claimed in claim 5, said information signal of each unit being an EKG signal having a periodically recurring R wave constituting said characteristic, said violation signal producing means of each unit including an oscillator for generating the violation signal, and means responsive to said EKG signal for activating said oscillator if the repetition rate of the R wave is above or below a predetermined range of repetition rates corresponding to said predetermined, normal organism condition.

8. The system as claimed in claim 7, said oscillator activating means of each unit being provided with a multivibrator for producing an output pulse in response to the occurrence of each R wave, an integrator responsive to said pulses and having an output level dependent upon the pulse frequency, and level sensing means responsive to the integrator output for triggering said oscillator to effect said activation thereof if the output level of the integrator falls below or rises above minimum or maximum levels, respectively, corresponding to the limits of said predetermined range of repetition rates.

9. The system as claimed in claim 8, said oscillator activating means of each unit being further provided with a threshold detector ahead of the multivibrator for receiving the EKG signal and passing the R wave thereof to the multivibrator if the amplitude of the R wave is above a predetermined minimum amplitude thereof corresponding to said predetermined, normal organism condition.

10. The system as claimed in claim 5, said monitor signal producing means of each unit including a frequency modulated oscillator having a modulating signal input, said information signal providing means deriving an EKG signal from the organism and applying the EKG signal to said input, said processing means having a frequency modulation discriminator for demodulating the monitor signal of the incoming composite signal fed thereto upon said operation of said switching means.

* * * * *